United States Patent [19]

Stephenson et al.

[11] Patent Number: 5,599,137

[45] Date of Patent: Feb. 4, 1997

[54] MOBILE SOIL TREATMENT APPARATUS AND METHOD

[75] Inventors: Robert J. Stephenson; John C. Nelson; Choom J. Lim; Kok-Seng Lim, all of Vancouver, Canada

[73] Assignee: Chemtech Analysis Inc., Richmond, Canada

[21] Appl. No.: 527,750

[22] Filed: Sep. 13, 1995

[51] Int. Cl.⁶ ................................................. B09B 3/00
[52] U.S. Cl. ...................... 405/128; 210/747; 588/249
[58] Field of Search ............................. 405/128, 129; 588/249, 256, 257; 210/747, 751, 620, 629, 758; 134/13, 10, 25.1; 208/391, 425, 400

[56] References Cited

U.S. PATENT DOCUMENTS

| | | | |
|---|---|---|---|
| 5,045,240 | 9/1991 | Skriba et al. | 252/626 |
| 5,149,444 | 9/1992 | Hoch | 405/128 X |
| 5,193,936 | 3/1993 | Pal et al. | 405/128 |
| 5,217,617 | 6/1993 | Duncan et al. | 210/620 |
| 5,230,794 | 7/1993 | Heijnen et al. | 210/188 |
| 5,232,596 | 8/1993 | Castaldi | 210/603 |
| 5,242,580 | 9/1993 | Sury | 405/128 X |
| 5,262,024 | 11/1993 | Lomasney et al. | 204/157.43 |
| 5,304,710 | 4/1994 | Kigel et al. | 588/257 |
| 5,368,411 | 11/1994 | Losack | 405/258 X |
| 5,391,018 | 2/1995 | Parker | 405/128 |
| 5,454,878 | 10/1995 | Bala et al. | 134/10 |

FOREIGN PATENT DOCUMENTS

| | | |
|---|---|---|
| 0185831A1 | 12/1984 | Germany. |
| 4000148C2 | 1/1990 | Germany. |
| 4303529A1 | 2/1993 | Germany. |

*Primary Examiner*—Dennis L. Taylor
*Attorney, Agent, or Firm*—Oyen Wiggs Green & Mutala

[57] ABSTRACT

A mobile apparatus and method for treating contaminated soil is disclosed. The apparatus consists of three interconnected subunits, namely a fluidized bed reactor for segregating an aqueous soil slurry based on particle size; a metals extraction unit for removing heavy metals and other contaminants from the contaminated soil fraction; and a water treatment system utilizing a high density sludge process to remove metals from the contaminated aqueous phase. The fluidized bed reactor includes a relatively small mixing chamber and a relatively large settling chamber which are partially separated by a baffle. Pressurized gas and foaming agent are dispersed into the mixing chamber to segregate the soil particles into a first fraction containing relatively small, contaminated soil particles and a second fraction containing relatively large, uncontaminated soil particles. The first fraction is continuously withdrawn from an upper portion of the reactor as a foam and a soil slurry containing the relatively uncontaminated second fraction is continuously withdrawn from a lower portion of the reactor. The soil slurry is dewatered by means of a hydrocyclone and a solids trap. Water, foaming agent and any suspended fines are recycled to the reactor vessel.

25 Claims, 10 Drawing Sheets

5,599,137

MOBILE SOIL TREATMENT APPARATUS AND METHOD

FIELD OF THE INVENTION

This application relates to a mobile apparatus and method for treating contaminated soil. The apparatus consists of three interconnected subunits, namely a fluidized bed reactor for segregating an aqueous soil slurry based on particle size; a metals extraction unit for removing heavy metals and other contaminants from the contaminated soil fraction; and a water treatment system utilizing a high density sludge process to remove metals from the contaminated aqueous phase.

BACKGROUND OF THE INVENTION

Contaminated soil sites pose serious environmental problems. Many industrial activities are likely to result in metals contamination of soil, such as mines, smelters, foundries, metal fabricating and plating industries, cement plants, shipyards, metal recycling facilities, bulk terminals, wood treatment yards, and surface finishing (sandblasting) industries. Soil contaminated with toxic heavy metals and organics often poses a long term environmental hazard to terrestrial and aquatic organisms in the vicinity of the contaminated site. Moreover, contaminated soil reduces property values and limits the real estate development or redevelopment potential of the site. Remediation of contaminated sites is desirable to reduce or eliminate these problems.

Most heavy metal contaminants are present in soil in the relatively small particle size clay, silt, humic and organic soil fractions. The larger particle size sand and gravel fractions are usually relatively uncontaminated. Several soil treatment techniques are known in the prior art which include a segregation step for concentrating contaminants by means of particle size separation. The disadvantages to the use of mechanical separators include high energy and maintenance costs and relatively poor separation of soil fractions. Often it is necessary to initially subject the soil to grinding and screening operations. Moreover, the efficiency of segregation varies depending upon the moisture content of the soil.

German patent document 4303529 is illustrative of the prior art. This reference discloses an apparatus and procedure for the chemico-physical and bio-physical treatment of contaminated soil which includes the step of subjecting the soil particles to shear forces within a water-filled washing reactor to separate the clay and organic fraction from coarser soil particles. The shear forces are generated by mechanical drums which rotate within the washing reactor to create air-water eddies.

The applicant has determined that a more efficient means for segregating soil by particle size is by injecting a stream of compressed air directly into a fluid mixing chamber. Fluidized beds and air flotation cells for carrying out chemical and biological reactions under controlled conditions are well known in the prior art, but they are not adapted for effectively segregating raw soil particles and managing the resulting solid fractions.

Another drawback of some prior art soil treatment systems is that they cannot be used to treat the contaminated soil in situ (i.e. at the site of contamination). Rather, the contaminated soil must be excavated and transported to the remediation site for treatment. The cleaned soil is then transported back to the excavation site. The need to transport large volumes of soil significantly increases the overall cost of the treatment process. The possibility of spillage of contaminated soil during transportation is also a concern.

The need has therefore arisen for a mobile soil treatment apparatus and method employing a fluidized bed reactor capable of segregating raw soil into contaminated and uncontaminated fractions in a continuous operation without resorting to mechanical grinders or separators.

SUMMARY OF THE INVENTION

An apparatus for treating contaminated soil is disclosed. The apparatus includes a reactor vessel for holding a volume of water which is subdivided into a first chamber and a second chamber. The chambers are in fluid communication and are partially separated by a baffle. A soil conveyor is provided for conveying a supply of the contaminated soil to the first chamber. A nozzle directs a supply of pressurized gas into the first chamber, thereby creating a turbulent mixture of soil and water in the first chamber to effect segregation of the soil into a substantially small particle size first fraction and a substantially large particle size second fraction. The reactor also includes a first outlet located in an upper portion of the second chamber for withdrawing the first soil fraction from the reactor and a second outlet located in a lower portion of the second chamber for withdrawing a slurry comprising the second soil fraction from the reactor.

In the preferred embodiment, the upper and lower portions of the first and second chambers are in fluid communication to permit circulation of the mixture of soil and water around the baffle. The first chamber preferably has a substantially smaller volume than the second chamber. The nozzle is located in a bottom portion of the first chamber for directing gas upwardly into the first chamber. The reactor may also include an inlet for dispersing a chemical reagent into the first chamber to enhance segregation of the soil into the first and second fractions.

The soil conveyor may consist of an inclined trough which terminates proximate the bottom portion of the first chamber. The trough is separated from the second chamber by a soil impervious panel. The soil conveyor may further include a hopper for continuously introducing soil into an upper portion of the inclined trough at a controlled rate. A plurality of inlet ports are provided for selectively introducing water or air into the trough.

The first outlet may consist of a plurality of closable outlet ports spaced at different distances from the first chamber. The reactor vessel is filled with water until the water surface is approximately level with the bottom of the outlet ports. An elongated collection tray is located on an external surface of the reactor for receiving the first soil fraction passing through the outlet ports.

The apparatus further includes a separator connected to the second outlet of the reactor for removing water and any relatively small soil particles present in the slurry withdrawn from the second outlet and continuously recycling the water and small soil particles back to the reactor for further treatment. The separator may include a hydrocyclone and a static column. Relatively large soil particles discharged from the hydrocylone settle in the static column against an upward flow of percolating water, while relatively small soil particles discharged from the hydrocylone are withdrawn from an upper portion of the static column and are recycled to the reactor.

The soil segregation subunit may comprise a dewatering apparatus connected to the first outlet for removing water and any foaming agents from the first soil fraction and recycling the water and foaming agents back to the reactor. The dewatering apparatus yields a solid cake of the substantially small soil particles which are conveyed to a metals extraction subunit for extracting contaminants from the first soil fraction. The metals extraction subunit includes at least one vessel for mixing the soil cake with a heated acid solution. The acidified soil slurry is passed through a microwave to enhance the desorption of contaminants from the soil particles. The microwave-treated soil is dewatered in a pressure filter and a portion of the effluent filtrate is recycled to the acid mixing vessel. The soil cake is rinsed and another portion of the contaminated effluent is conveyed to a water treatment subunit. The pH of the effluent stream is raised in the water treatment subunit to precipitate the contaminants and thereby form a stable sludge.

A method for treating soil containing contaminants is also disclosed comprising the steps of (a) introducing the soil into a reactor vessel containing a volume of water; (b) introducing a supply of pressurized gas into the reactor vessel to create a turbulent mixture of soil and water, thereby effecting segregation of the soil into a first fraction containing the contaminants which comprises small size soil particles and a second fraction which comprises substantially large size, uncontaminated soil particles; (c) dispersing a foaming reagent into the turbulent mixture to create a foam comprising the first fraction; (d) withdrawing the foam from an upper portion of the reactor vessel; (e) withdrawing a slurry comprising the second fraction from a lower portion of the reactor vessel; (f) separating the slurry into a third fraction comprising the large size soil particles and a fourth fraction comprising water, foaming reagent and any relatively small size soil particles present in the slurry; and (g) recycling the fourth fraction to the reactor vessel. The soil is preferably introduced into the reactor vessel continuously and the foam and slurry are withdrawn from the reactor vessel continuously.

In an alternative embodiment, an apparatus and method for treating contaminated soil may comprise: a soil segregation subunit for segregating the soil into a substantially small particle size first fraction containing the contaminants and a substantially large particle size second fraction; and an extraction subunit for extracting the contaminants from the first fraction. The extraction subunit may include a heated reactor vessel for mixing the first fraction with a supply of acid to yield an acidified soil slurry; and a flow-through microwave for subjecting the acidified soil slurry to microwave degradation. The extraction unit may further comprise means downstream from the microwave for recycling a portion of the acid present in the slurry to the acid supply. A pressure filter may also be provided for rinsing the slurry with water to yield clean soil and an effluent stream containing the contaminants. A water treatment subunit is connected to the pressure filter for treating the effluent to precipitate the contaminants.

BRIEF DESCRIPTION OF THE DRAWINGS

In drawings which illustrate the preferred embodiment of the invention, but which should not be construed as restricting the spirit or scope of the invention in any way.

DETAILED DESCRIPTION OF THE PREFERRED EMBODIMENT

This application relates to an apparatus and method for treating contaminated soil. The invention is primarily designed to remove heavy metals and organic contaminants from soil in situ in a commercially viable, cost-effective manner.

Figure 1:
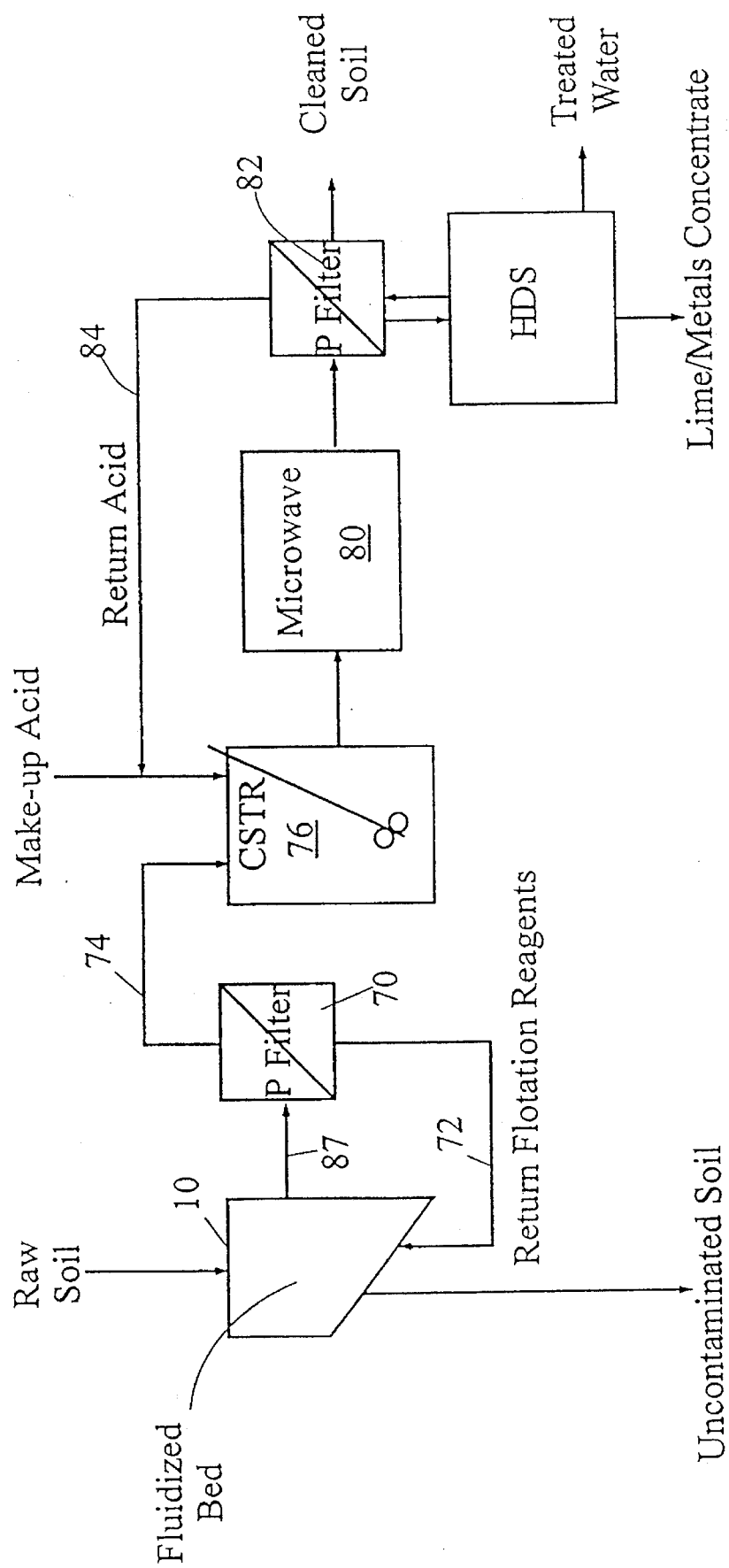
FIG. 1 is a schematic view of the applicant's overall process for treating contaminated soil.

FIG. 1 is a schematic drawing of the applicant's overall apparatus and process for remediating contaminated soil. The invention consists of three interconnected subunits, namely (1) a soil segregation subunit for concentrating contaminants by means of particle size separation; (2) a metals extraction subunit for removing heavy metals and organic contaminants from the contaminated soil fraction; and (3) a water treatment subunit for removing metals from the aqueous stream.

SOIL SEGREGATION SUBUNIT

The soil segregation subunit is designed to physically separate the contaminated soil fraction from the remainder of the raw soil. Metal contaminants tend to bind physically and chemically to organic, clay, humic and silt particles. Such particles are themselves often attached to sand and gravel. The soil segregation subunit is designed to separate the smaller particle size organic, clay, humic and silt fractions from the larger particle size sand and gravel fractions in a continuous process. This substantially reduces the volume of contaminated soil requiring treatment in the subsequent metals extraction and water treatment subunits.

As shown in FIGS. 2–7, the applicant's soil segregation subunit comprises a fluidized bed reactor 10 for separating raw soil according to particle size. Reactor 10 has a small front mixing chamber 12 and a larger rear settling chamber 14 which are partially separated by a vertical baffle 16. The upper and lower portions of chambers 12, 14 are connected to allow water and suspended soil particles to circulate around baffle 16, improving washing efficiency.

A soil inlet 18 is located at the upper, rear end of reactor 10 which continuously receives a supply of raw soil from a hopper 19. An inclined trough 20 extends downwardly and forwardly from soil inlet 18 to the bottom portion of front chamber 12. As shown best in FIGS. 4 and 5, trough 20 is separated from rear chamber 14 by an inclined panel 22.

An elongated collection tray 24 is mounted on a side panel 25 of reactor 10 at an upper location thereof. Collection tray 24 is subdivided by a wall 26 into a front receptacle 28 and a rear receptacle 30. As discussed further below, a plurality of spaced-apart, adjustable outlet ports 32 are formed in side panel 25 to allow foam to overflow from reactor rear chamber 14 into the front receptacle 28 of collection tray 24.

A single discharge port 34 is provided for connecting tray front receptacle 28 to the metals extraction subunit described further below.

The collection tray rear receptacle 30 is separated from soil inlet 18 by a divider 36 having a slot 37 formed therein. As discussed further below, floating debris present in the raw soil inflow, such as bark, shells, plastic fragments and other floatable debris, passes through slot 37 into rear receptacle 30. A single vertical outlet port 38 is provided for discharging such debris to waste.

Figure 7:
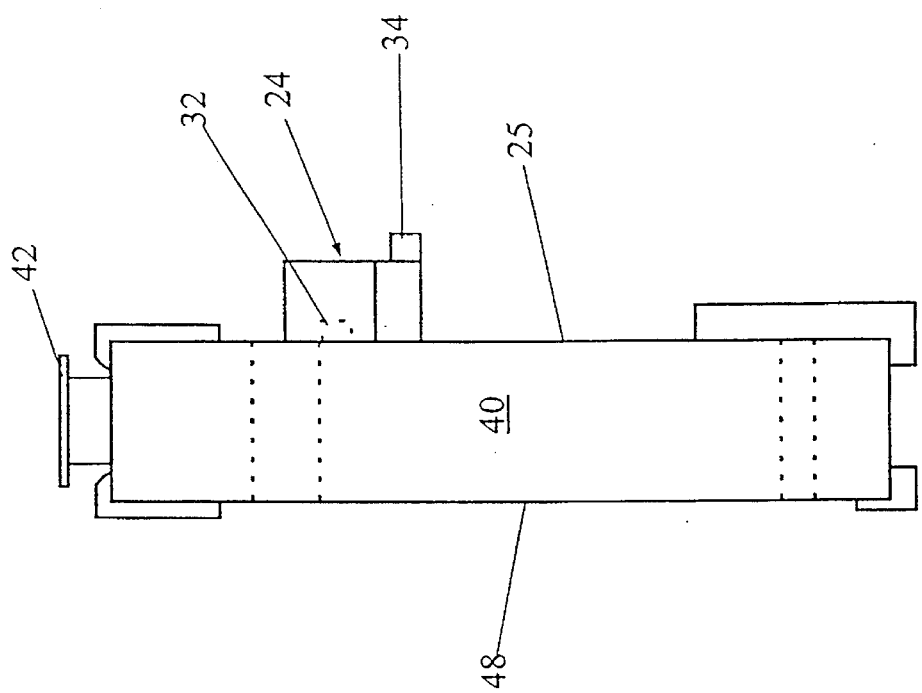
FIG. 7 is a front elevational view of the reactor of FIG. 3.
Figure 6:
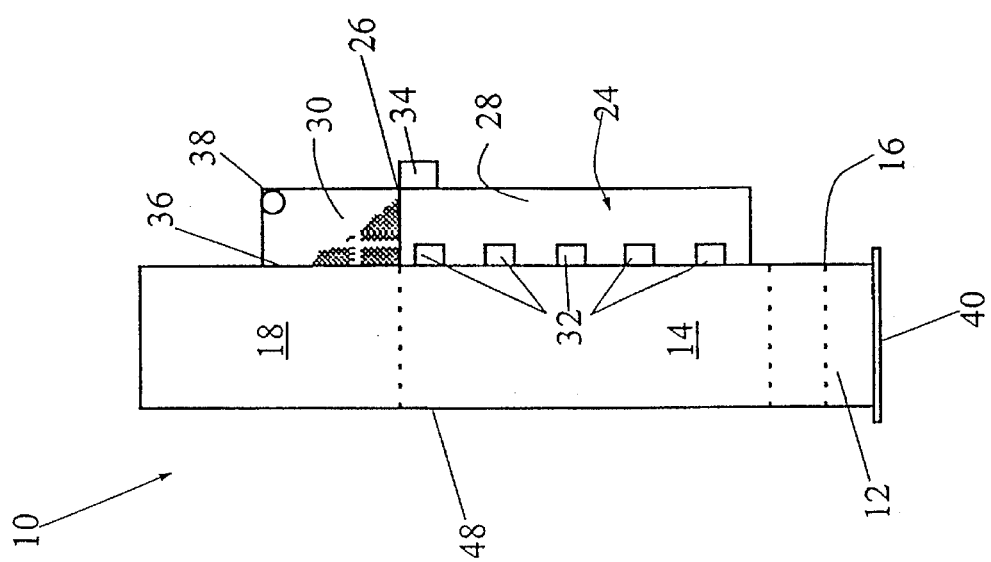
FIG. 6 is a top plan view of the reactor of FIG. 3.

In the illustrated embodiment, the front end of reactor 10 is covered with a clear plexiglass cover 40 to enable visual monitoring of mixing operations. A plexiglass viewing port 42 is also mounted on the top panel 43 of reactor 10 at the front end. A gas vent 39 is located near the rear end of top panel 43 (FIGS. 5 and 7).

Figure 5:
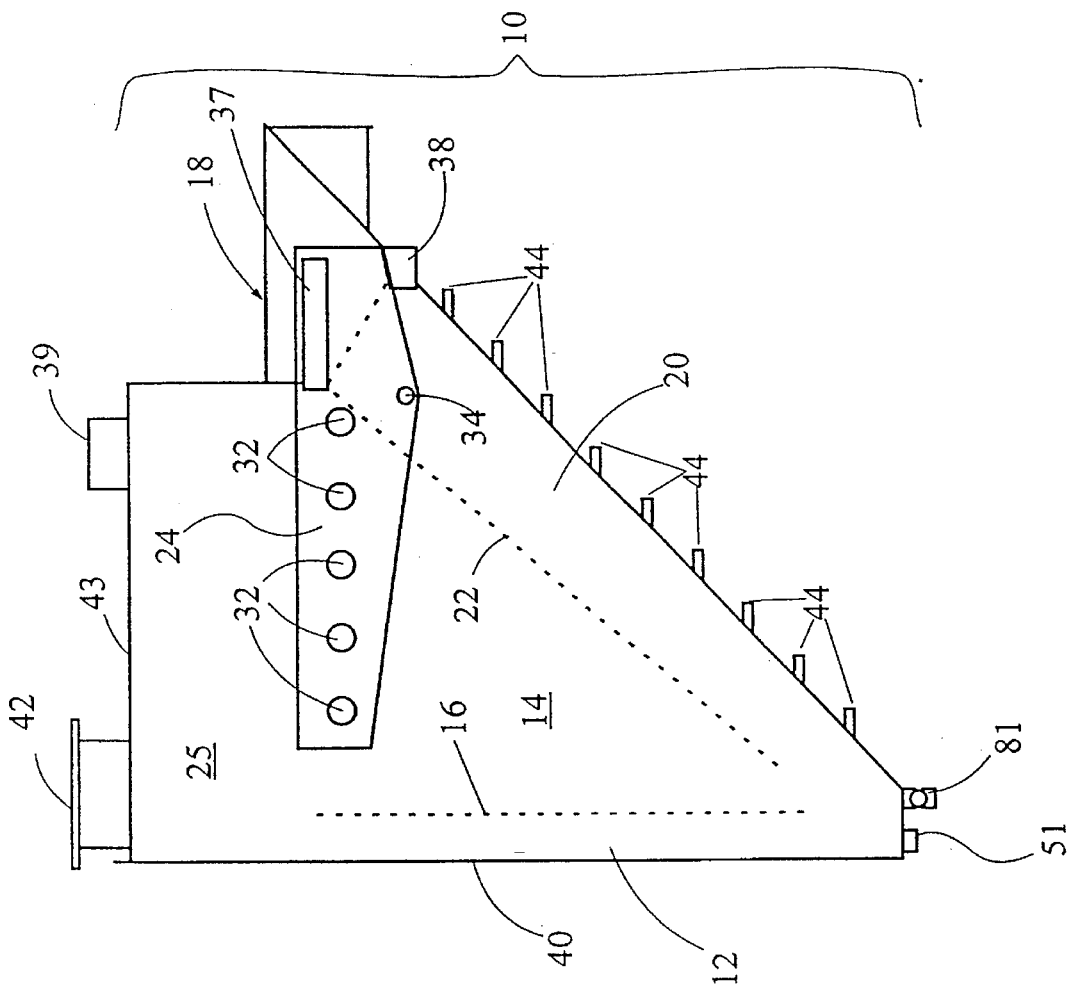
FIG. 5 is a side elevational view of the reactor of FIG. 3.

A series of spaced-apart water/air inlet ports 44 are mounted on the rear panel 45 of fluidized bed reactor 10 in communication with inclined trough 20 (FIG. 5). As discussed further below, inlet ports 44 may be selectively connected to water and/or air supplies.

A series of spaced-apart reagent inlets 46 are located on a side panel 25 and/or 48 of reactor 10 at the front end thereof. Reagent inlets 46 are in communication with the front mixing chamber 12 of fluidized bed reactor 10. As shown schematically in FIGS. 2(*a*) and 2(*b*), chemical reagents, such as a supply 49 of foaming agent, may be conveyed through a conduit 35 via a chemical metering pump 53 to a selected reagent inlet 46.

A series of spaced-apart soil slurry outlets 50 are also located on side panel 48 near the front end of reactor 10. Soil slurry outlets 50 are in fluid communication with a bottom, forward portion of rear settling chamber 14.

An air injection nozzle 51 is located at the bottom, front end of reactor 10 (FIG. 5). Nozzle 51 is connected via conduit 54 to a compressed air supply or blower 55 (FIG. 2(*b*)). Nozzle 51 includes an air distributor for directing a stream of pressurized air upwardly into the front chamber 12 of fluidized bed reactor 10 to create a turbulent mixture of raw soil and water within reactor 10. The surfaces of the soil particles are scoured by this turbulent mixing.

Figure 2:
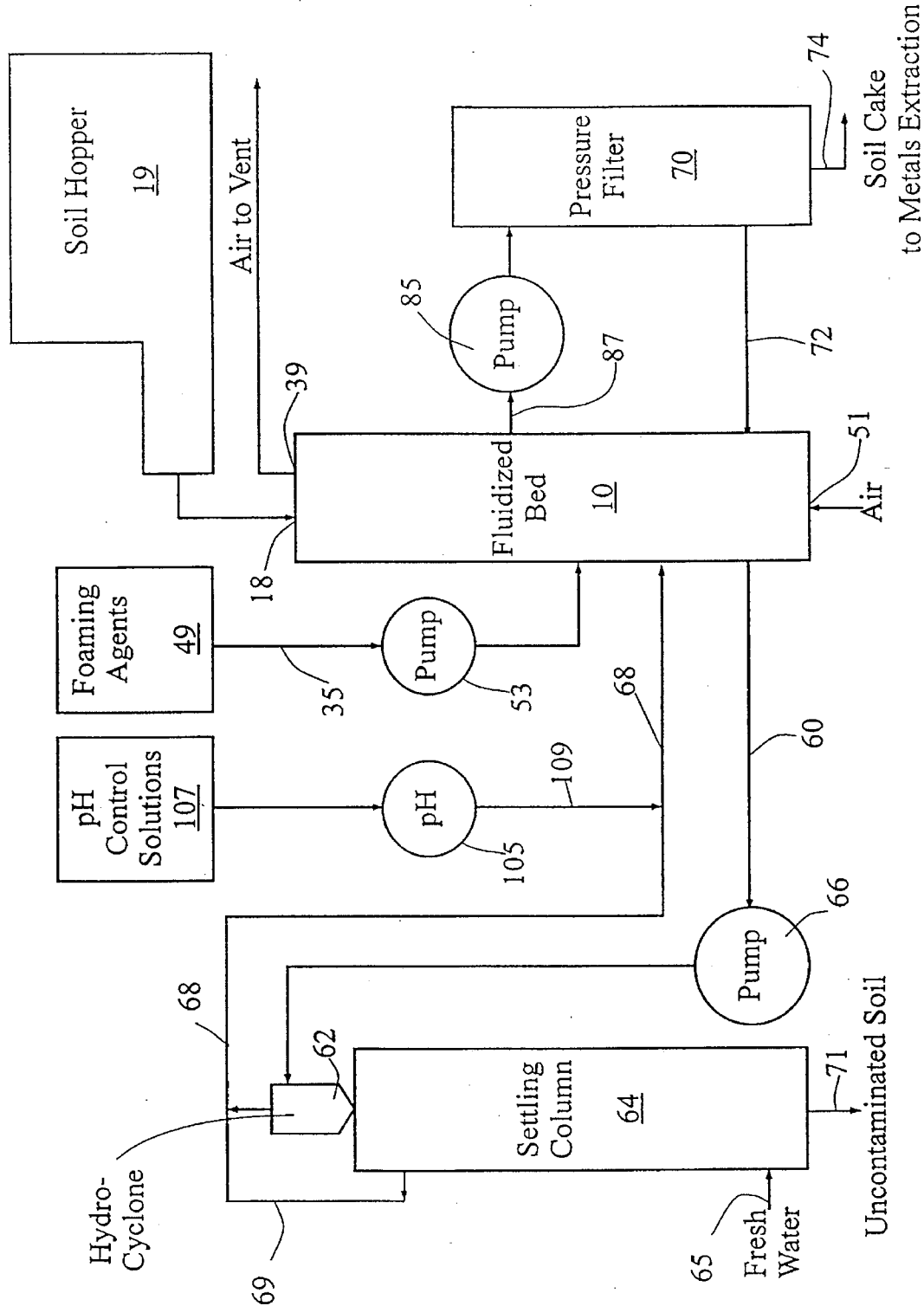
FIG. 2(a) is a schematic view of the soil segregation subunit.
FIG. 2(b) is a detailed schematic view of the soil segregation subunit.
Figure 2:
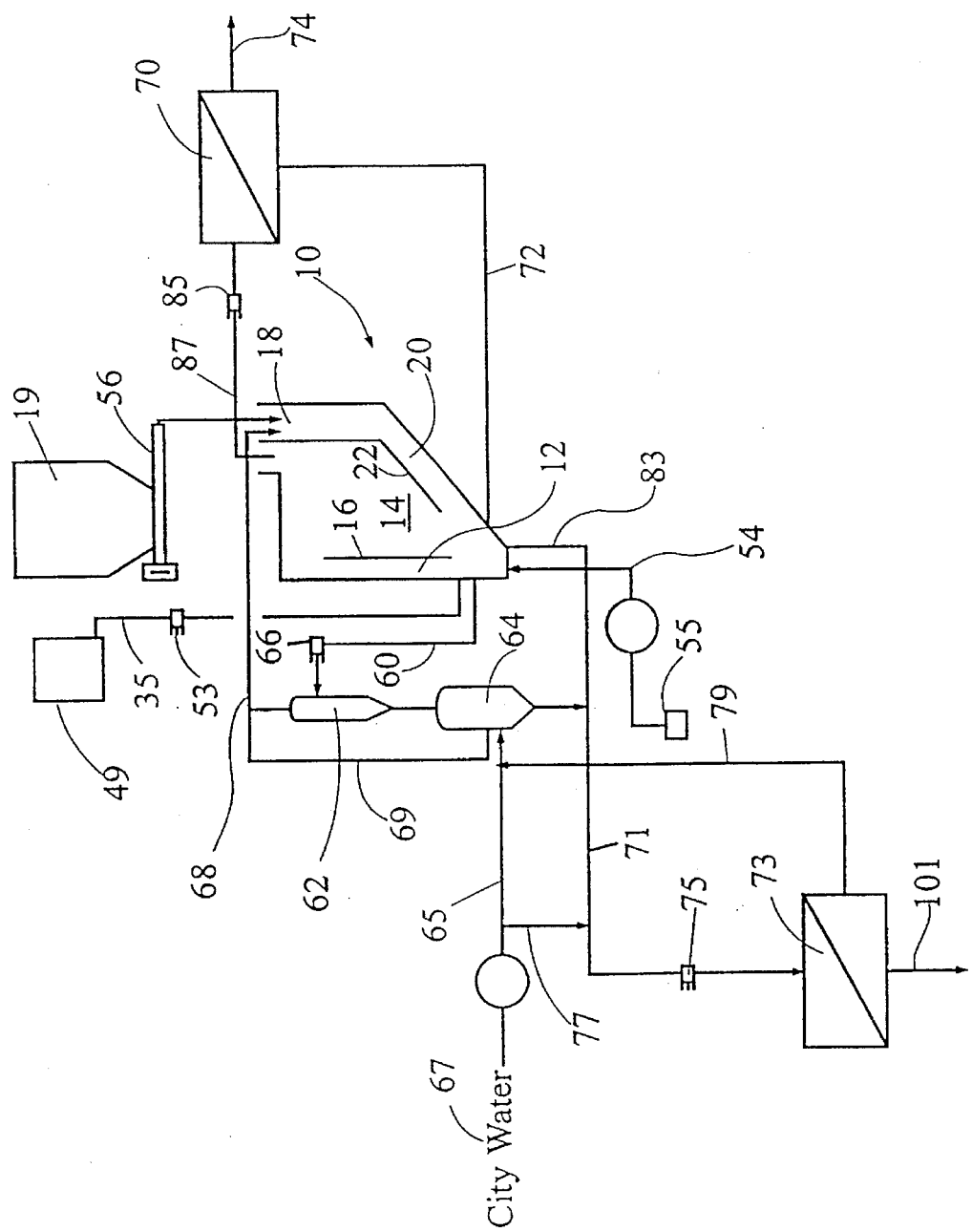

The soil segregation unit also includes a hydrocyclone 62 mounted on a static water column (i.e. solids trap) 64 separate from fluidized bed reactor 10 (FIGS. 2(*a*), 2(*b*) and 3). A solids pump 66 is provided for pumping the soil slurry discharged from an outlet 50 through a conduit 60 to hydrocyclone 62. Hydrocyclone 62 separates the incoming slurry into a water stream and a granular soil fraction by centrifugal force. The water stream, and any water-borne foaming agents, are continuously recycled from hydrocyclone 62 back to reactor 10 through a conduit 68. The water stream is either discharged from conduit 68 directly into soil inlet 18, or may be connected to a water/air inlet 44 or a reagent inlet 46.

Figure 3:
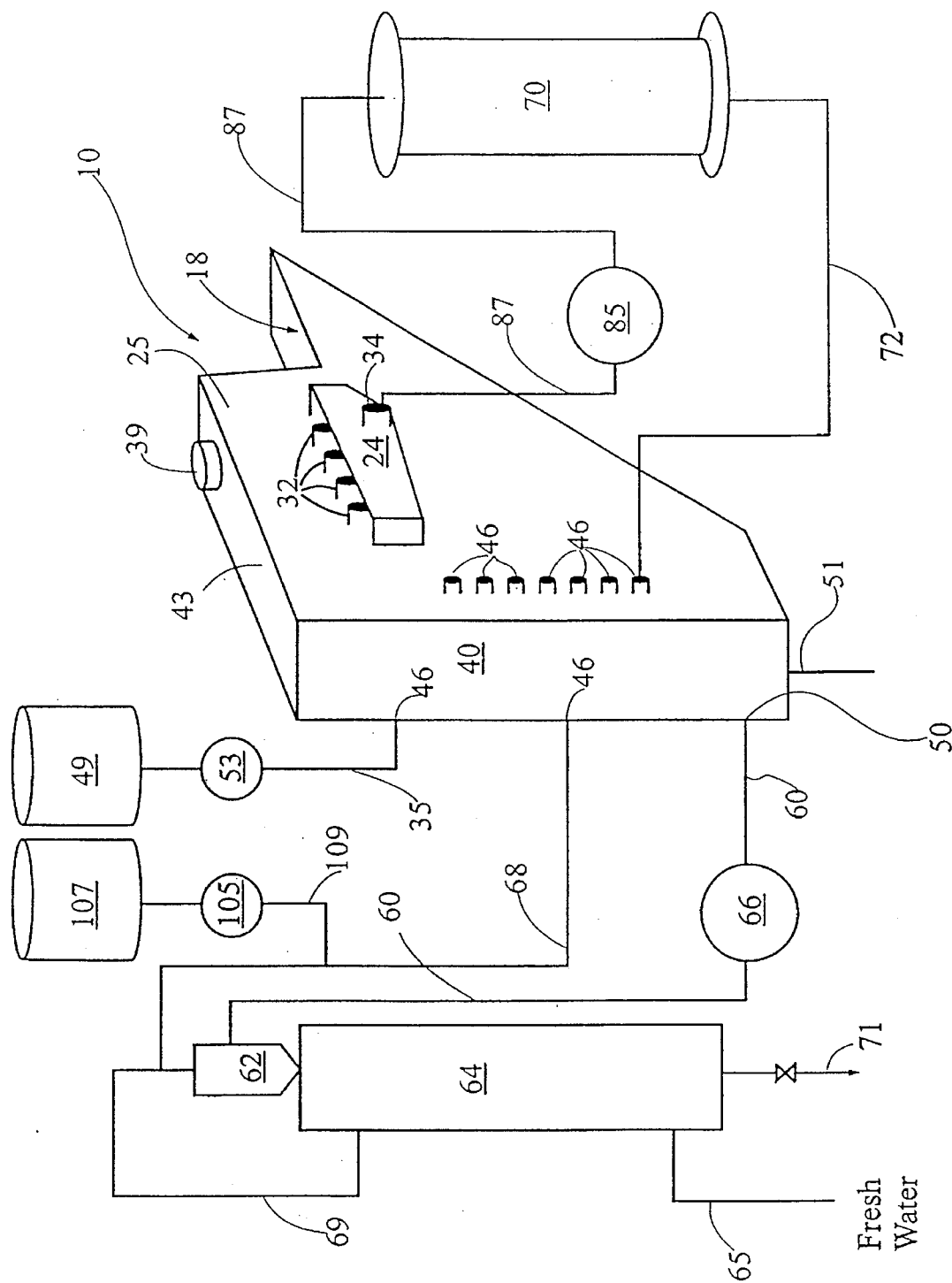
FIG. 3 is an isometric view of the fluidized bed reactor connected to a hydrocylone and static column solids trap.
Figure 4:
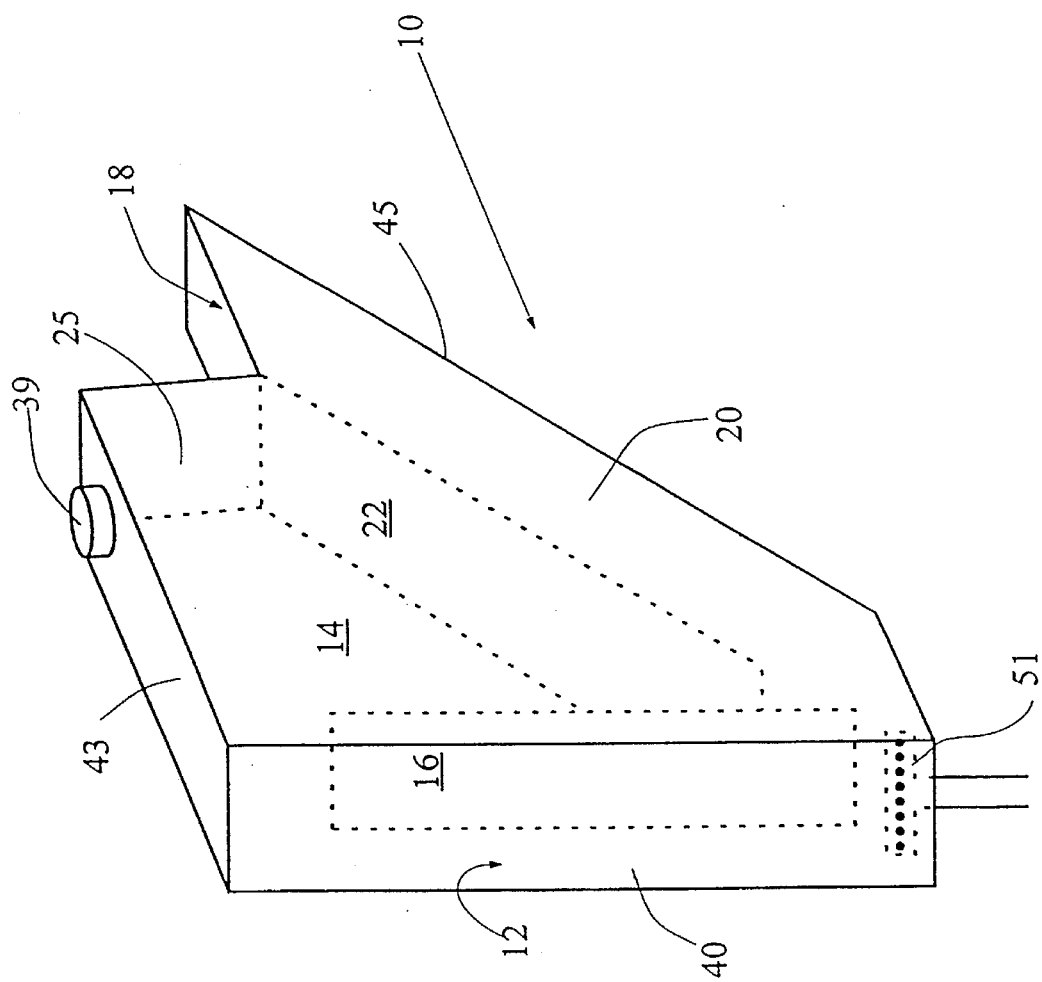
FIG. 4 is a cut-away view of the reactor of FIG. 3 showing the internal baffle.

Solutions for controlling the pH of the water stream recycled to fluidized bed reactor 10 may optionally be introduced into conduit 68 as shown in FIG. 3. A pump 105 is provided for discharging the solutions from a supply 107 through a conduit 109. By way of example, the pH control solutions may comprise caustic (sodium hydroxide) for enhancing the action of foaming agents or other reagents. The pH control solutions may be added to increase the solubility of specific soil contaminants such as hydrocarbons.

The granular soil fraction is discharged from hydrocyclone 62 into static water column 64. Column 64 is connected via a conduit 65 to a water supply 67, such as a local water line. Relatively large, uncontaminated soil particles gradually settle at the bottom of column 64 against an upward flow of percolating water. The smaller, fine soil particles, which may contain contaminants, are concentrated in an upper portion of column 64 by the up-welling water. The fines are recycled back to reactor 10 for further processing through a conduit 69 which merges with the water stream discharged into conduit 68 (FIG. 2).

The relatively large, uncontaminated soil particles which settle at the bottom of column 64 are discharged through a conduit 71 to a first pressure filter 73 by means of a pump 75 (FIG. 2B). A stream of wash water from water supply 67 may be added to conduit 69 via a conduit 77. The uncontaminated soil particles are dewatered in filter 73 and are returned to the excavation site through a flow line 101. The wash water is returned to static column 64 via a conduit 79.

Fluidized bed reactor 10 also includes an outlet valve 81 for periodically draining very heavy soil particles or other uncontaminated debris which settle at the bottom of reactor 10. When valve 81 is opened, such uncontaminated soil and debris drain into conduit 83 which merges into conduit 71 (FIG. 2B).

In operation, fluidized bed reactor 10 is filled with water to a level approximately even with the bottom of outlet ports 32. Raw contaminated soil is introduced into soil inlet 18 in a continuous stream. For example, excavated raw soil may be initially dumped into hopper 19. Hopper 19 is fitted with a screw auger 56 to discharge the raw soil at a controlled rate into inlet 18 (FIG. 2(*b*)).

The raw soil slurry passes from inlet 18 down inclined trough 20 to the front, bottom portion of reactor 10 by gravitational forces. Makeup water from conduit 68 may be introduced into trough 20 through one or more inlet ports 44 to assist in propelling the soil slurry downwardly.

Compressed air may also be blown through one or more inlet ports 44 to help buoy any floatable debris present in the raw soil. The buoyed debris floats through slot 37 formed in divider 36 into the rear receptacle 30 of collection tray 24, and thereafter passes through outlet 38 to waste. This initial separation of non-soil debris, such as shells, plastic fragments, bark and the like from the material inlet stream substantially reduces downstream consumption of acidic reagents.

The upward stream of compressed air injected through nozzle 51 into front mixing chamber 12 creates a vacuum which draws the soil slurry from the forward end of trough 20 into chamber 12. The compressed air stream causes very turbulent mixing of the soil slurry in front chamber 12 which scours the surfaces of the soil particles. The scoured soil separates into a clay and silt fraction, ordinarily containing the majority of heavy metal and organic contaminants, and a relatively uncontaminated, heavier soil fraction comprising larger sand and grit particles.

Foaming agents or other chemical reagents may be dispersed into front chamber 12 through one or more of the inlets 46 (FIG. 3). The association of the foaming agents with the clay and silt fractions causes them to become hydrophobic which enhances the separation efficiency. Most foaming agents include separate reagents designed to cause frothing and to stabilize the foam for collection. As should be apparent to someone skilled in the art, the selection of foaming agents will depend on the type of soil to be treated. For example, a combination of DOWFROTH 250=(frothing reagent) and pine oil (collection/stabilization reagent) has been shown to exhibit high specificity to clay soil fractions (which typically contain heavy metals). Oily reagents such as pine oil or kerosene readily adsorb to many organic particles.

The smaller clay and organic particles (i.e. the "first soil fraction") become suspended in the foam and float primarily in the upper portion of reactor rear chamber 14. The heavy sand and grit particles (the "second soil fraction") circulate around the upper end of baffle 16 and gradually settle into the lower portion of rear chamber 14. The settled, second soil fraction may be drawn back into front chamber 12 for further mixing, or may be discharged through one or more of the soil slurry outlets 50 into conduit 60. This prevents excess accumulation of the second soil fraction at the bottom of the fluidized bed reactor 10.

Reactor 10 thus functions as a hybrid between a fluidized bed and an air flotation cell. The fluidized bed aspect offers excellent mixing characteristics which serve to scour the soil and remove organic and clay fractions from the sand and grit matrix. The air flotation aspect of the segregation system is related to the use of foaming agents in order to float and remove the contaminants in a continuous operation.

As discussed above, conduit 60 is connected to a hydrocyclone 62 mounted on a static water column 64 separate from fluidized bed reactor 10. Solids pump 66 is provided for pumping the soil slurry discharged from reactor 10 to hydrocyclone 62. The hydrocyclone 62 separates the solid and liquid phases of the soil slurry containing the second soil fraction and continuously recycles the liquid phase, which may contain foaming agents, through conduit 68 back to fluidized bed reactor 10. The heavier soil particles which settle in column 64 are discharged to first pressure filter 73 for dewatering and return to the excavation site.

The smaller, fine soil particles, which may contain contaminants, are concentrated in an upper portion of column 64 by the upwelling flow of water. Such smaller, fine soil particles are returned to reactor 10 via conduit 69 for further treatment. The smaller, potentially contaminated, soil particles may be circulated between reactor 10 and static column 64 several times before they adsorb sufficient foaming agent to float within reactor rear chamber 1, ultimately to be discharged through outlet ports 32.

The contaminated clay and organic fraction suspended in the floating foam overflows from rear chamber 14 through outlet ports 32 into the front receptacle 28 of collection tray 24. The number of outlet ports 32 which need be opened depends upon the stability and volume of the foam containing the contaminated soil fraction.

Foam collected in tray 24 is discharged through port 34 into a conduit 87 and is propelled by means of a pump 85 to a second pressure filter 70. Filter 70 concentrates the contaminated soil fraction into a solid cake and recycles water and foaming agents present in the foam discharge back to the fluidized bed reactor 10 through a conduit 72 for reuse. Conduit 72 may discharge directly into soil inlet 18 of reactor 10, or may be connected to a water/air inlet 44 or a reagent inlet 46.

The solid cake of contaminated soil is next conveyed to the metals extraction subunit of the applicant's soil treatment system for further processing. Approximately 10% of the soil initially introduced into fluidized bed reactor 10 ultimately passes to the next stage of the treatment process (the amount varies depending upon the makeup of the soil).

METALS EXTRACTION SUBUNIT

Figure 8:
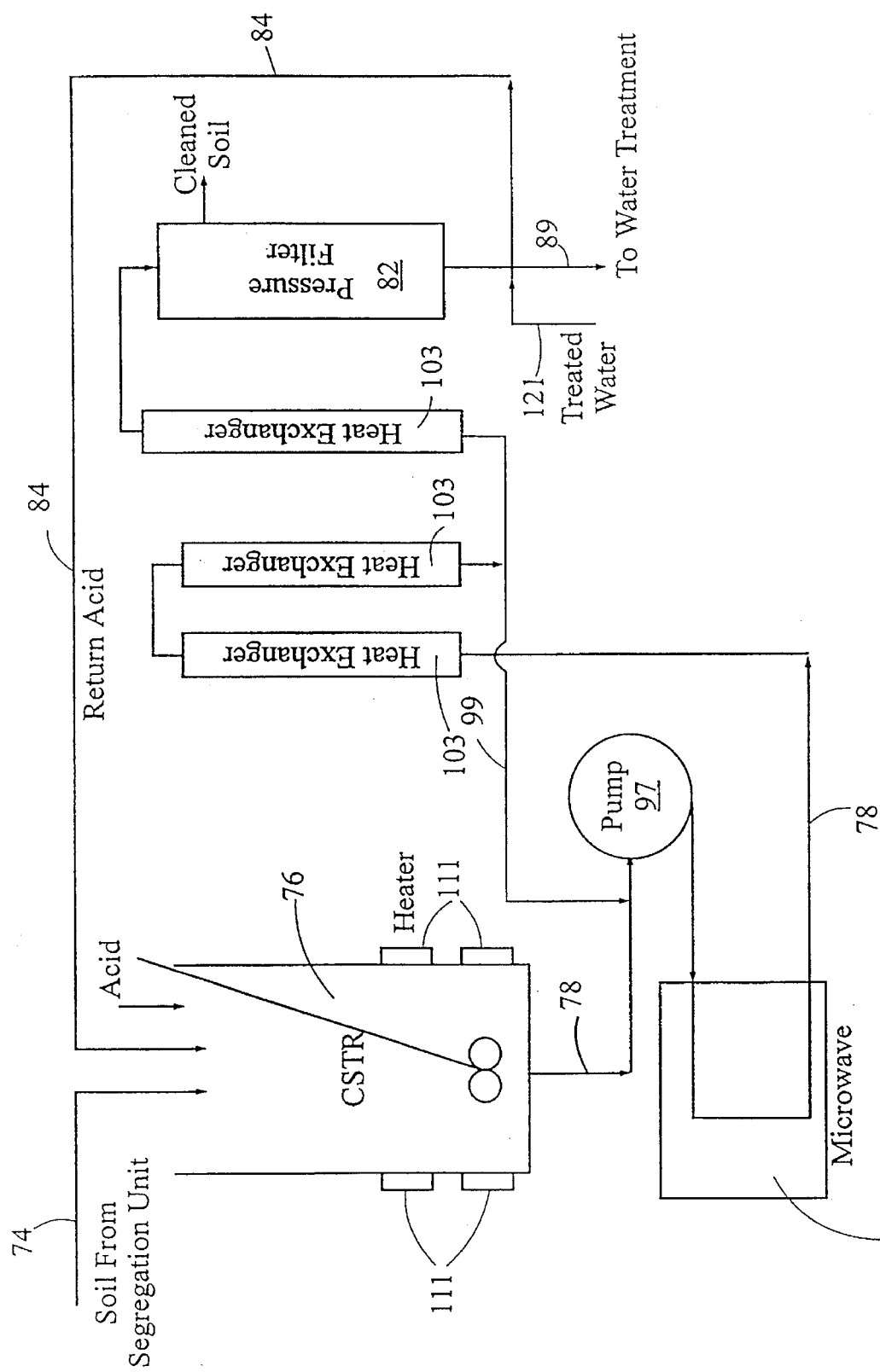
FIG. 8 is a detailed schematic view of the metals extraction subunit.

As shown schematically in FIG. 8, the metals extraction subunit consists of a series of treatment steps for extracting heavy metals and other contaminants from the first soil fraction (containing foamed clay and organics) discharged from fluidized bed reactor 10.

The solid cake formed in the soil segregation subunit is conveyed from second pressure filter 70 through a conduit 74 to one or more continuously stirred tank reactors 76 where the soil particles are subjected to acid treatment. Reactor 76 includes heaters 111 to increase reaction rates. Concentrated acid, such as 10–35% HCl, is added to reactor 76 in controlled amounts. The acid is conveyed from an acid supply through a conduit into reactor 76 by means of a pump (not shown). The rate of mixing in the reactor 76 is set to control the solids residence time to achieve a target metal removal efficiency. Ten minutes is a typical solids residence time.

Each reactor 76 acts essentially as a leach tank. Under acidic conditions, metals are usually far more mobile than under neutral or alkaline conditions. This is due to the compounding effect of several factors. Most metals dissolve under acidic conditions and some cation exchange sites have pH dependent charges, with the net result that there are fewer exchange sites at low pH. Moreover, the solubility of metallic complexes of organic matter changes with pH. Thus, reducing the pH of the contaminated soil fraction within the reactor 76 has the net effect of making most metal species more readily removable from associated soil particles.

In the illustrated embodiment, the soil slurry is subjected to a two step heating and mixing operation in the metals extraction subunit. In the first stage the soil slurry is mixed with acid in reactor 76 as discussed above and heated to approximately 60° C. such that vapour emitted from the warm acid is not problematic. The second stage is to increase the temperature of the acid slurry in a heating circuit comprising a conventional flow-through microwave oven 80 and a series of heat exchangers 103. The combination of reactor 76 and the heating circuit effectively constitutes a mixed reactor vessel.

As shown in FIG. 8, the soil is conveyed by means of a pump 97 from reactor 76 through a conduit 78 which passes through the reaction cavity of microwave oven 80. Microwave oven 80 is modified to include shielded inlets and outlets. Dissociating wave energy, such as microwave energy, has been shown to effect or enhance the desorption of many ionic species from a soil matrix. Microwave energy appears to be particularly effective in desorbing metal and heavy metal ions from clay soil particles.

The flow rate is preferably set so that the acidified soil particles are resident within the microwave reaction cavity for approximately one minute. During this period the soil particles are subjected continuously to microwave energy.

Following microwave degradation, the soil slurry passes through a series of heat exchangers 103. The temperature of the soil slurry in the heating circuit is raised to approximately 100° C. or more in order to enhance metals extraction. The acidified soil slurry may pass through the heating circuit several times. In the embodiment illustrated in FIG. 8, the soil slurry passes from the second heat exchanger 103 through a flow line 99 to join the conduit 78 which passes through microwave 80. Thus the soil may be subjected to several cycles of microwave degradation.

The acidified soil slurry is periodically discharged from the heating circuit to a third heat exchanger which is provided reduce the temperature of the slurry and thereby reduce the emission of hot acid vapour (FIG. 8). The slurry is then conveyed to a third pressure filter 82 where the slurry is dewatered by filtration and the metals laden acid stream (i.e. effluent) is split. Part of the acid stream is recycled back to reactor 76 through conduit 84. The remainder of the acid stream passes to the water treatment subunit described below. Recycling a portion of the acid reagent reduces the cost of the metal extraction process and also reduces the volume of lime required in the water treatment process.

The soil cake which remains in pressure filter 82 comprises approximately equal portions of solid soil particles and the metals laden acid stream. The soil cake is washed by periodically backwashing filter 82 with treated water (derived from the water treatment subunit described further below). Backwashing is necessary to dilute the contamination to ensure that the cleaned soil is suitable for discharge. The cleaned, remediated soil particles are periodically discharged from filter 82 to the excavation site.

As shown in FIG. 8, that portion of the contaminated, metals-laden effluent which is not recycled is pumped from filter 82 through a conduit 89 to the water treatment subunit for further processing.

WATER TREATMENT SUBUNIT

Upon extracting the heavy metals (or other contaminants from the soil), the contamination problem is shifted from the solid to the aqueous phase. The water treatment subunit is designed to remove the metals from solution. The water treatment subunit employs a high density sludge (HDS) process developed in part by Cominco Engineering Services Ltd. of Vancouver, Canada and Tetra Technologies of Houston, Tex. The purpose of the HDS process is to increase the pH of the effluent solution in a step-wise process by the addition of calcium hydroxide (lime) under aerobic conditions to precipitate the metal contaminants from solution.

Figure 9:
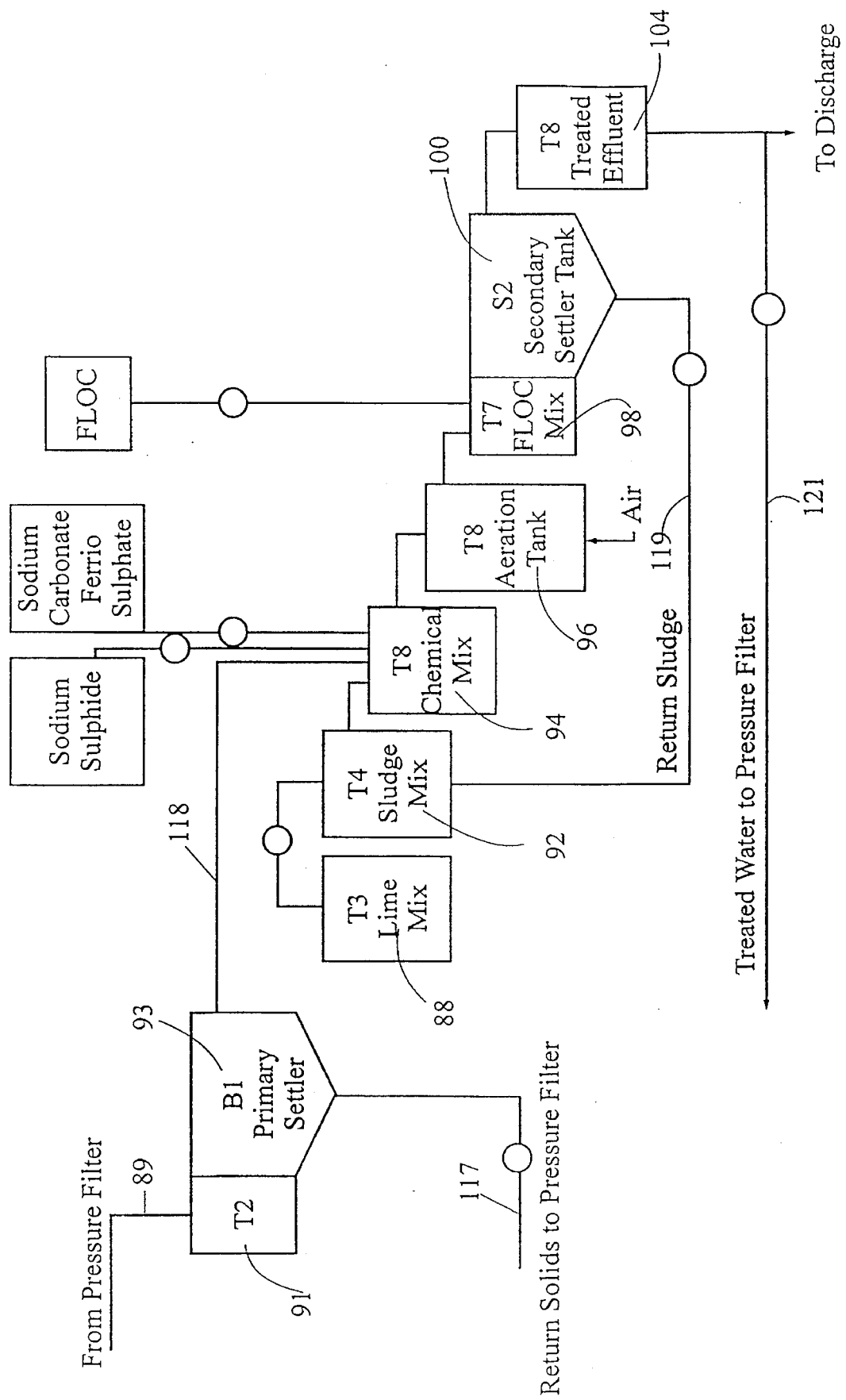
FIG. 9 is a detailed schematic view of the water treatment subunit.

The water treatment subunit is illustrated schematically in FIG. 9. The effluent discharged from pressure filter 82 passes through a conduit 89 to a holding tank 91. The effluent is then treated in a primary settling tank of clarifier 93. Any fine soil particles present in the effluent stream are settled in tank 93 and recycled to pressure filter 82 through flow line 117.

A combination of lime from a tank 88 and recycled sludge is added to a sludge-lime mix tank 92 at the head of the effluent treatment process. The metals-containing supernatant from primary settling tank 93 is conveyed through a conduit 118 and added to this slurry in a rapid mix tank 94 to result in a pH of 9.0 to 9.5. Most metals precipitate at or below this concentration of hydroxide ions. This elevated pH is also required for ferrous iron oxidation. Sodium sulphide, sodium carbonate and ferric sulphate reagents may also be added to mix tank 94 as shown in FIG. 9.

The effluent is next treated in a main lime reactor 96. High rate aeration under turbulent conditions in the main lime reactor 96 helps to promote rapid reaction rates and to oxidize iron. Flocculant is added in tank 98 to facilitate rapid settling of the particles. Clarification occurs in secondary settling tank 100. The sledge produced from treating the metals extraction effluent using the HDS process settles well and is easily dewatered. A portion of the sludge is recycled back through flow line 119 to the sludge-lime mix tank 92 at the head of the effluent treatment process and the remainder is wasted to a sludge tank (not shown).

The effective removal of metals in the HDS process is due to metal precipitates and co-precipitates of iron on the surface of the recycled particles. High iron to total metals favours the stability of the precipitates.

The metals laden sludge may be treated further using metal reclamation processes, or may be transported to a secure landfill for disposal. The volume of sludge produced by the applicant's process is very small relative to the volume of contaminated raw soil treated. The volume of lime/metal sludge produced by the process is typically between 0.3–2.0% by weight of the total raw soil treated.

The clear supernatant is pumped from secondary settling tank 100 to a holding tank 104 and optionally to an activated carbon column (not shown). The treated water is then returned to the third pressure filter 82 through conduit 121 to rinse the acidified soil slurry discharged from the heating circuit following microwave degradation as shown in FIGS. 8 and 9. A portion of the treated water may also be discharged to waste or returned to the fluidized bed reactor 10 for further processing.

Figure 10:
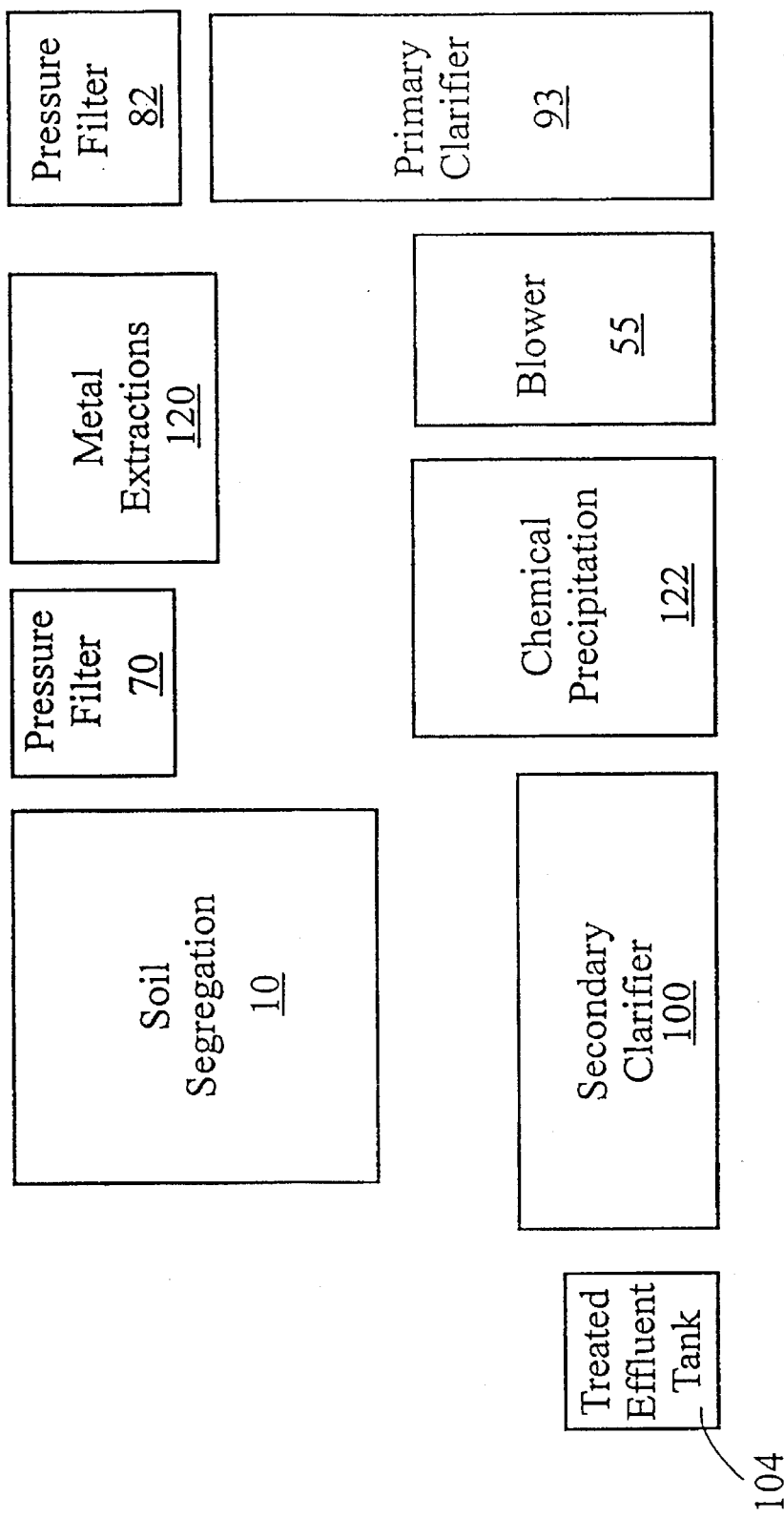
FIG. 10 is a schematic plan view illustrating the overall layout of the applicant's mobile soil treatment apparatus installed on a trailer.

The applicant's soil treatment apparatus, including the soil segregation, metal extraction and water treatment subunits, has been designed in a modular fashion so it may be readily assembled on a trailer or other vehicle for transport to soil contamination sites accessible by road (FIG. 10). The apparatus could also be installed on a barge to assist in remediating dredged sediments in a cost-effective manner. The metals extraction component 120 shown in FIG. 10 comprises the reactor 76, microwave oven 80, pump 97, heat exchangers 103 and associated flow lines discussed above. The blower 55 provides a supply of pressurized air to nozzle 51 of fluidized bed reactor 10 and aeration tank 96 of the water treatment subunit. Component 122 refers to the interconnected tanks 88, 92, 94, and 96 of the water treatment subunit shown in FIG. 9 for precipitating contaminants present in the effluent stream.

As will be apparent to those skilled in the art in the light of the foregoing disclosure, many alterations and modifications are possible in the practice of this invention without departing from the spirit or scope thereof. The applicant's fluidized bed reactor could be adapted for removing contaminants from soil other than heavy metals, such as hydrocarbons or polychlorinated biphenyls (PCBs). For example, heated steam vapour could be injected through nozzle 51 into front mixing chamber 12 in order to increase the solubility of hydrocarbons. Alternatively, a heater (not shown) could be placed on return line 72 for heating the water and foaming agents recycled from second pressure filter 70.

In another alternative embodiment, other chemical reagents, such as hydrogen peroxide, could be introduced into the front mixing chamber 12 through one of the reagent inlets 46. Hydrogen peroxide is effective in converting mercury contaminants, which are often present in soil in different valence states, to mercury oxide. This mercury oxide may be separated by using elutriation or flotation. Hydrogen peroxide also has the benefit of oxidizing many organic contaminants.

The scope of the invention should be construed in accordance with the substance defined by the following claims.

What is claimed is:

1. An apparatus for treating contaminated soil comprising:
   (a) a reactor vessel for holding a volume of water, said vessel having a first chamber and a second chamber;
   (b) a baffle partially separating said first and second chambers, wherein said chambers are in fluid communication;
   (c) a soil conveyor for conveying a supply of said contaminated soil to said first chamber;
   (d) a nozzle for directing a supply of pressurized gas into said first chamber, thereby creating a turbulent mixture of said soil and water in said first chamber to effect segregation of said soil into a substantially small particle size first fraction and a substantially large particle size second fraction;
   (e) a first outlet located in an upper portion of said second chamber for withdrawing said first soil fraction from said reactor; and
   (f) a second outlet located in a lower portion of said second chamber for withdrawing a slurry comprising said second soil fraction from said reactor.

2. The apparatus of claim 1, wherein upper and lower portions of said first and second chambers are in fluid communication to permit circulation of said mixture of soil and water around said baffle.

3. The apparatus of claim 2, further comprising a inlet for dispersing a foaming reagent into said first chamber to enhance segregation of said soil into said first and second fractions.

4. The apparatus of claim 3, wherein said nozzle is located in a bottom portion of said first chamber and directs said gas upwardly into said first chamber.

5. The apparatus of claim 4, wherein said soil conveyor comprising an inclined trough which terminates proximate said bottom portion of said first chamber.

6. The apparatus of claim 5, wherein said trough is separated from said second chamber by a soil impervious panel.

7. The apparatus of claim 4, wherein said first chamber has a substantially smaller volume than said second chamber.

8. The apparatus of claim 4, wherein said first outlet comprises a plurality of closable outlet ports spaced at different distances from said first chamber.

9. The apparatus of claim 8, wherein said outlet ports are located slightly above the level of said water in said reactor vessel.

10. The apparatus of claim 9, further comprising an elongated collection tray on an external surface of said reactor for receiving said first soil fraction passing through said outlet ports.

11. The apparatus of claim 5, wherein said soil conveyor further comprises a hopper for continuously introducing soil into an upper portion of said inclined trough at aa controlled rate.

12. The apparatus of claim 5, further comprising a plurality of inlet ports for selectively introducing water or air into said trough.

13. The apparatus of claim 2, further comprising a separator apparatus connected to said second outlet of said reactor for separating said second soil fraction from water and any relatively small soil particles present in said slurry and continuously recycling said water and small soil particles back to said reactor for further treatment.

14. The apparatus of claim 13, wherein said separator apparatus comprises a hydrocylone.

15. The apparatus of claim 14, further comprising a static column connected to said hydrocyclone, wherein relatively large soil particles discharged from said hydrocylone settle in said static column against an upward flow of percolating water, and wherein said relatively small soil particles discharged from said hydrocylone are withdrawn form an upper portion of said static column and are recycled to said reactor.

16. The apparatus of claim 3, wherein said apparatus further comprises:
(a) a dewatering apparatus connected to said first outlet for removing water and any foaming reagent from said first soil fraction and recycling said water and foaming reagent to said reactor, wherein said dewatering apparatus yields a solid cake of said substantially small soil particles; and
(b) a metals extraction subunit connected to said dewatering apparatus for extracting contaminants from said first soil fraction, wherein said metals extraction subunit comprises:
(i) at least one vessel connected to said dewatering apparatus for mixing said solid cake with a heated acid solution to yield an acidified soil slurry; and
(ii) a microwave connected to said vessel for subjecting said acidified soil slurry to microwave degradation to enhance the desorption of said contaminants from said substantially small soil particles.

17. The apparatus of claim 16, further comprising a pressure filter for rinsing said acidified soil slurry with water to yield an effluent stream containing said contaminants.

18. The apparatus of claim 17, further comprising a water treatment subunit connected to said pressure filter for raising the pH of said effluent stream to precipitate said contaminants and thereby form a stable sludge.

19. A method for treating soil containing contaminants comprising the steps of:
(a) introducing said soil into a reactor vessel containing a volume of water;
(b) introducing a supply of pressurized gas into said reactor vessel to create a turbulent mixture of said soil and water, thereby effecting segregation of said soil into a first fraction containing said contaminants comprising substantially small size soil particles and a second fraction comprising substantially large size uncontaminated soil particles;
(c) dispersing a foaming reagent into said turbulent mixture to create a foam comprising said first fraction;
(d) withdrawing said foam from an upper portion of said reactor vessel;
(e) withdrawing a slurry comprising said second fraction from a lower portion of said reactor vessel;
(f) separating said slurry into a third fraction comprising said large size soil particles and a fourth fraction comprising water, foaming reagent and any relatively small size soil particles present in said slurry; and
(g) recycling said fourth fraction to said reactor vessel.

20. The method of claim 19, wherein said soil is introduced into said reactor vessel continuously and said foam and said slurry are withdrawn from said reactor vessel continuously.

21. The method of claim 20, further comprising the steps of:
(a) separating said foam into a fifth fraction comprising a cake of said substantially small size soil particles and a sixth fraction comprising water and foaming reagent; and
(b) recycling said sixth fraction back to said reactor vessel.

22. The method of claim 21, further comprising the steps of:
(a) mixing and heating said fifth fraction with an acid supply to yield a heated acid slurry; and
(b) subjecting said acid slurry to microwave degradation.

23. The method of claim 22, further comprising the steps of:
(a) dewatering said acid slurry to yield a cake of soil particles and an effluent stream laden with contaminants;
(b) recycling a first portion of said effluent stream to said acid supply;
(c) rinsing said cake of soil particles with water; and
(d) precipitating contaminants present in a second portion of said effluent stream to produce a stable sludge and a volume of uncontaminated water.

24. The method of claim 23, further comprising the step of recycling part of said uncontaminated water to said reactor vessel or said rinse water supply.

25. A method for treating soil containing contaminants comprising the steps of:
 (a) introducing said soil into a reactor vessel containing a volume of water;
 (b) introducing a supply of pressurized gas into said reactor vessel to create a turbulent mixture of said soil and water, thereby effecting segregation of said soil into a first fraction containing said contaminants comprising substantially small size soil particles and a second fraction comprising substantially large size uncontaminated soil particles;
 (c) withdrawing said first fraction from an upper portion of said reactor vessel;
 (d) withdrawing a slurry comprising said second fraction from a lower portion of said reactor vessel;
 (e) separating said slurry into a third fraction comprising said large size soil particles and a fourth fraction comprising water, foaming reagent and any relatively small size soil particles present in said slurry; and
 (f) recycling said fourth fraction to said reactor vessel.

* * * * *